US006847655B2

United States Patent
Colombo et al.

(10) Patent No.: US 6,847,655 B2
(45) Date of Patent: Jan. 25, 2005

(54) METHOD AND APPARATUS FOR TRANSMITTING/RECEIVING HIGH ORDER DIGITAL SIGNALS OVER TWO RF CARRIERS IN A RADIO REGENERATION SECTION

(75) Inventors: Claudio Colombo, Biassono (IT); Primo Garofoli, Milan (IT)

(73) Assignee: Alcatel, Paris (FR)

( * ) Notice: Subject to any disclaimer, the term of this patent is extended or adjusted under 35 U.S.C. 154(b) by 872 days.

(21) Appl. No.: 09/809,260

(22) Filed: Mar. 16, 2001

(65) Prior Publication Data

US 2001/0046239 A1 Nov. 29, 2001

(30) Foreign Application Priority Data

Mar. 17, 2000 (IT) ..................................... MI2000A0545

(51) Int. Cl.[7] .................................................. H04J 3/24
(52) U.S. Cl. ....................... 370/474; 370/535; 370/539; 370/349; 370/350; 370/503; 370/514
(58) Field of Search ................................. 370/474, 539, 370/349, 537–545, 350, 503, 514, 535; 714/744

(56) References Cited

U.S. PATENT DOCUMENTS

| | | | | |
|---|---|---|---|---|
| 5,675,585 A | * | 10/1997 | Bonnot et al. ............... | 714/701 |
| 5,841,760 A | * | 11/1998 | Martin et al. ................ | 370/242 |
| 6,094,737 A | * | 7/2000 | Fukasawa .................... | 714/738 |
| 6,430,201 B1 | * | 8/2002 | Azizoglu et al. ............ | 370/535 |
| 6,714,531 B1 | * | 3/2004 | Oide et al. ................... | 370/349 |

OTHER PUBLICATIONS

ITU–T Recommendation G.957 dated Jun. 1999 entitled Optical interfaces for equipments and systems relating to the synchoronous digital hierachy, Series G: Transmission Systems and Media, Digital Systems and Networks.

High Capacity Digital Radio Relay Systems Carrying STM–4 in Two 40 MHz channels or 2×STM–1 in 40 MHz Channel with Alternate Channel Arrangement, Revised Feb. 9, 1999, DEN/TM–4065.

Transmission and Multiplexing (TM) Digital Radio Relay Systems (DRRS); High Capacity DRRS Transmitting STM–4 or 4×STM–1 in a 40 MHz Radio Frequency Channel Using Co–Channel Dual Polarized (CCDP) Operation, Draft EN 301 277, V1.1.1 (Aug. 1998) European Standard (Telecommunications series).

Fixed Radio Systems; Point–to–Point Equipment; High Capacity Digital Radio Relay Systems Carrying 2×STM–1, 4×STM–1 or STM–4 signals in bands with 55/56 MHz channel spacing, Draft DEN/TM 4105 (Jun. 2000), European Standard (Telecommunications series).

\* cited by examiner

*Primary Examiner*—Wellington Chin
*Assistant Examiner*—Chuong Ho
(74) *Attorney, Agent, or Firm*—Sughrue Mion, PLLC (57) ABSTRACT

A method is described for transmitting/receiving STM-4 (SDH) or STS-12 (SONET) digital signals over two RF carriers in a radio regenerator section. The method provides for performing, in transmission, a de-interleaving operation of the standard frame to be transmitted in such a way as to subdivide it by columns into two sub-frames. The RSOH bytes of the standard frame are terminated and transmitted over the two working channels or over one service channel and one working channel so as to be protected in a 1+1 configuration: In reception, a column interleaving operation recombines together the two sub-frames and recovers and correctly rearranges the RSOH bytes so terminated as to obtain the standard frame originally received from the transmitter. The generated sub-frames are synchronized with the standard frame.

16 Claims, 5 Drawing Sheets

| FAW | A1 = 1111 0110 | A1 = 1111 0110 | A2 = 0010 1000 | A2 = 0010 1000 |
|---|---|---|---|---|
| Long (24 bit) | xxxx 0110 | 1111 0110 | 0010 1000 | 0010 xxxx |
| Short (12 bit) | xxxx x1x0 | 111x xx1x | x0xx x000 | 0x1x xxxx |

METHOD AND APPARATUS FOR TRANSMITTING/RECEIVING HIGH ORDER DIGITAL SIGNALS OVER TWO RF CARRIERS IN A RADIO REGENERATION SECTION

BACKGROUND OF THE INVENTION

1. Field of the Invention

The present invention relates to radio transmissions and in particular it concerns a method and apparatus for transmitting/receiving STM-4 (SDH) or STS-12 (SONET) digital signals over two RF carriers in a respective SDH or SONET radio regenerator section.

2. Description of the Prior Art

In present telecommunication systems, the need often arises (particularly with operators who have to manage congested networks) of providing high capacity radio systems with high spectrum efficiency and not much complex architecture. These radio systems are required to transmit high order digital signals, such as STM-4 (SDH) or STS-12 (SONET) synchronous hierarchy levels, at 622.08 Mb/s. Such links must be capable of being inserted in optical networks on STM-4 interface nodes with all the features of performance monitoring, management, protection, etc . . . The above needs are also apparent from the last issues of some ETSI Recommandations.

The solution which is at present known for interconnecting an STM-4 data stream with a radio equipment provides for the transmission of four STM-1 signals over four corresponding RF carriers. In essence, it is a solution providing for the transmission of four STM-1 signals in the radio section and allows the transport of an STM-4 stream in a regenerator section, by using four RF carriers in a 4+2 protection system configuration.

It is clear that this type of approach does not optimize the spectral efficiency of the transmission system. Moreover, it requires the use, in the radio link, of four transceivers (in addition to two spare transceivers) and the management of four STM-1 channels in a minimal configuration of the protection system that contemplates the use of two protection channels (4+2 protection).

SUMMARY OF THE INVENTION

In view of the above needs and of the known solutions which are not considered as completely efficient, it is the main object of the present invention to provide a method and an apparatus for transmitting/receiving high order digital signals over two RF carriers in a radio regenerator section, such as STM-4 signals in an SDH radio regeneration section or STS-12 signals in a SONET radio regeneration section.

The main object of the present invention is providing a method of radio transmitting high order synchronous digital signals wherein it comprises the steps of terminating the Regenerator Section OverHead bytes of the received standard frames and performing a computation of the parity byte; providing a Radio Frame Complementary OverHead; transmitting the terminated Regenerator Section OverHead bytes and the Radio Frame Complementary OverHead interleaved by columns in a 1+1 protected configuration; and wherein said step of subdividing the received standard frame into a number of sub-frames comprises the step of subdividing by columns the standard frame into two sub-frames for transmitting them over working channels by using only two RF carriers without performing any multiplexing/demultiplexing operation.

A further object of the present invention is providing a method of receiving high order synchronous digital signals which have been transmitted via radio, wherein it comprises a step of combining sub-frames, said step of combining sub-frames comprising the step of recomposing by columns the received sub-frames through a mapping process based on the recognition of the respective alignment words and of the header to identify the correct sequence of the two received sub-frames; and wherein it comprises the further steps of extracting the Regenerator Section OverHead bytes from a Radio Frame Complementary OverHead and inserting said Regenerator Section OverHead bytes in the respective positions after the step of recomposing by columns.

A still further object of the present invention is providing an apparatus for radio transmitting high order digital signals, wherein said apparatus comprises means for terminating the header bytes of the received frames and performing computation of a parity byte; means for sending the terminated RSOH bytes to a frame complementary section for the transmission thereof in a 1+1 protection scheme, interleaved by columns with the sub-frames, over two working channels or over a working channel and a protection channel; and means for subdividing the received standard frame into a number of sub-frames, said subdividing means comprise means designed to subdivide by columns the standard frame into two sub-frames for transmitting them over working channels by using only two RF carriers without performing any multiplexing/demultiplexing operation.

A further object of the present invention is providing an apparatus for receiving high order synchronous digital signals transmitted via radio, wherein said apparatus comprises: means for combining the sub-frames, said means interleaving by columns the received sub-frames through a mapping process based on the recognition of the respective alignment words and of the header to identify the correct sequence of the two received sub-frames; and wherein said apparatus further comprises means for extracting the RSOH bytes from a frame complementary section; and means for inserting the RSOH bytes in the respective positions after the step of recomposition-by-columns.

Further advantageous characteristics of the methods and apparatuses are set forth in the respective dependent claims. All the claims are considered as an integral part of the present description.

As far as the transmission of SDH synchronous signals is concerned, the basic idea of the present invention is to transmit an STM-4 (or possibly a STS-12) signal (with a line optical interface, in accordance with the ITU-T Recommendation G.957) in a radio equipment by using only two RF carriers, without performing any signal multiplexing or demultiplexing, and without any pointer processing, thus using the radio system as a pure regenerator network element (NE).

In this concern, just for the sake of clarity and in order to avoid a too long description, the following description is mainly referred to SDH (Synchronous Digital Hierarchy) transmission but it is well considered that it is equally extended and applicable to SONET (Synchronous Optical Network) transmission.

The present invention will certainly result in being clear from the following detailed description, given by way of a mere non limiting example, to be read with reference to the attached drawing figures.

BEST MODE FOR CARRYING OUT THE INVENTION

As said above, in order to transmit high order digital signals from one radio equipment to another radio equipment in a transmission system, the present invention substantially provides for subdividing, in a manner that will be described later on, the frames of the signals to be transmitted into two sub-frames. These two sub-frames are then transmitted by using only two RF carriers, without performing any signal multiplexing or demultiplexing operation, and without any pointer processing, thus using the radio system as a pure regenerator network element (NE).

The method of the invention, hereafter described for the transmission of STM-4 SDH signals, consists in dividing the STM-4 signal which is present at the network interface (namely, at the input of the transceiver) into two STM-4/2 signals to be transmitted over two modulated carriers in proper channel spacing and with a minimal configuration (2+1) of the protection system. Clearly, "channel spacing" means the distance between two adjacent frequencies in the channeling used.

For example, in a bandwidth of about 55 MHz and by using two cross-polar carriers at the same frequency with a Cross-Polar Interference Canceller (XPIC) it is possible to transmit an STM-4 signal, thus increasing the spectrum efficiency of the system up to 622.08 Mbps/55 MHz=11.31 bit/s/Hz. It is to be noticed that the transmission of the two STM-4/2 signals is independent of the radio frequency used and of the modulation scheme applied. Accordingly, it is possible to implement the considerations that will be described below both in the short-haul systems and in the long-haul ones.

With a high integration level of the base band signal processing, of the hitless protection system and of the service auxiliary channel transmission, the system architecture according to the invention can meet all the requirements necessary for being used in STM-4 (STS-12) transport networks, STM-4 (STS-12) access areas and STM-4 (STS-12) ring networks.

As it is known, at present the transmission of an STM-4 signal over limited-band radio channels occurs through a multiplex system. In this event the Multiplex Section (MST) between two Network Nodes should be interrupted by additional multiplex/demultiplex sections. This fact is against the SDH network philosophy, and in disagreement with the functional requirements stated by the Recommendations.

For this reason, the STM-4 radio-relay system according to the invention comprises Regenerator Sections (RST) only, without any multiplex/demultiplex operation being carried out.

This solution guarantees that all information contained in the Virtual Containers, the Multiplex Section Overhead (MSOH) and the AUOH pointer row are transmitted in a rather transparent manner inside the radio section, where only the RSOH bytes are processed.

In order to understand the de-interleaving and interleaving mechanisms described hereinafter (indeed exploiting the symmetry characteristics of the structures contained in the SDH frames), consider the allocation of AU-4 (VC-4) structures in an STM-4 frame.

The STM-4 frame may comprise four AUG-1s, that will be numbered from #1 to #4:

AUG-1#1 is allocated in columns 1, 5, 9, 13, . . . of the STM-4 frame;

AUG-1#2 is allocated in columns 2, 6, 10, 14, . . . of the STM-4 frame;

AUG-1#3 is allocated in columns 3, 7, 11, 15, . . . of the STM-4 frame; and

AUG-1#4 is allocated in columns 4, 8, 12, 16, . . . of the STM-4 frame.

Each AUG-1 may comprise three AU-3 structures, that will be numbered from #1 to #3. Therefore, each AU-4 can be identified by a number in the form #B, #A, where B indicates the AUG-1 number (from 1 to 4), and A is always 0.

The identification of the columns, in the STM-4 frame, occupied by the AU-4 (B,0) structures is given by:

$X$th column=1+[$B$−1]+4*[$X$−1] (for $X$=1 to 270).

As a consequence, the AU-4 (1,0) structure resides in the columns 1, 5, 9, . . . , 1077 of the STM-4 frame, and the AU-4 (4,0) structure resides in the columns 4, 8, 12, . . . , 1080 of the STM-4 frame.

Figure 1:
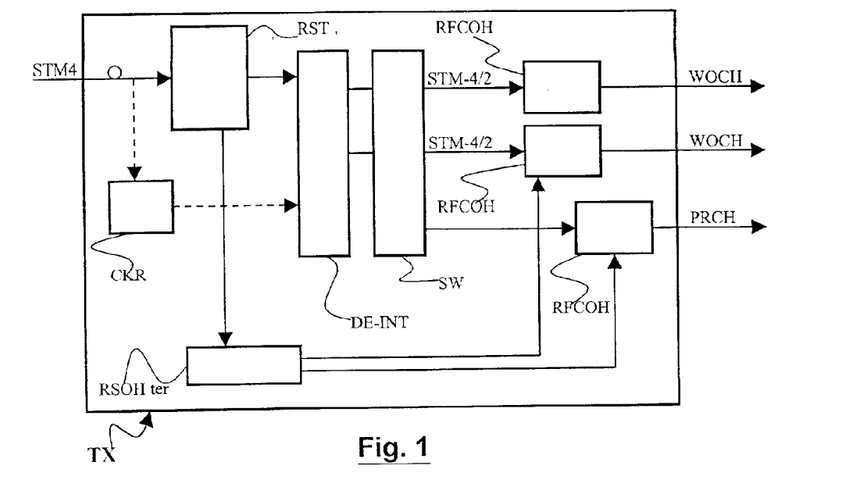
FIG. 1 shows a block diagram of the transmitter apparatus according to the present invention.

In consideration of the above, the transmitter apparatus (TX) according to the present invention will now be described with reference to FIG. 1. On the incoming STM-4 signal, the Regenerator Section Termination (RST) performs the regeneration of the RSOH (Regenerator Section OverHead) bytes and calculates the parity byte B1 of the STM-4 frame. In other words, at the RST section, the DCCR, E1, F1 bytes (and possibly other service channels) are terminated by, extracted from, the STM-4 frame and passed on in the RFCOH section so as to maintain at all times the interconnection of the supervision network between the line side and the radio side. The RFCOH (Radio Frame Complementary OverHead) section increases the capacity of each sub-frame and allows the transmission of the DCCR, E1, F1 channels and other service channels protected in an at least 1+1 configuration. In essence, the bytes containing the service channels are interleaved with the columns of the STM-4/2 sub-frames and transmitted over two radio channels (for instance, a working channel (WOCH) and the protection one (PRCH) or over the two working channels (WOCH) in case there are not noise and/or decay phenomena in each of the sub-frames transported on the working channels). The 1+1 protection configuration assures the preservation of the network interconnection also in the event of loss of one of the two sub-frames in the radio channel. Thus, in principle, it might happen to loose the information to be transmitted but it becomes more difficult to loose the interconnection of the supervisory network.

Figure 3:
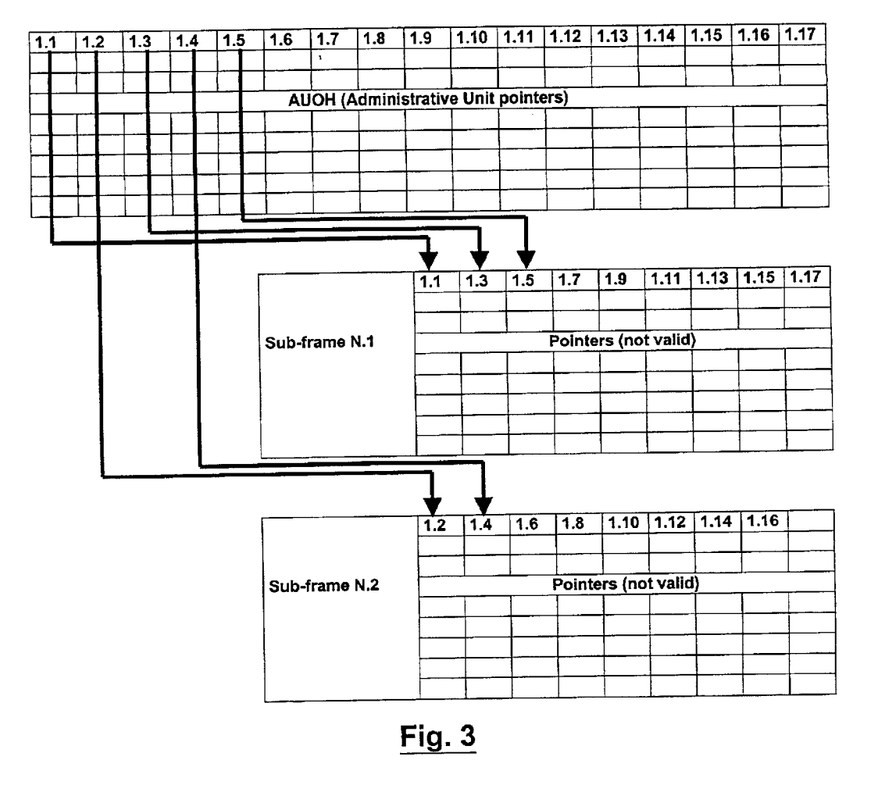
FIG. 3 schematically shows how the de-interleaving process occurs.

As shown in FIG. 3, the de-interleaving process divides the incoming STM-4 standard frame, by partitioning it by columns over two STM-4/2 streams at 311.04 Mb/s. In other words, the bytes of the odd columns are arranged in the first sub-frame (sub-frame N.1) whereas the bytes of the even columns are arranged in the second sub-frame (sub-frame N.2). Naturally, in so doing, the pointers of the single sub-frames will no longer be valid. As still shown in FIG. 1, the block (DE-INT) that carries out the frame de-interleaving process, also receives information concerning synchronization from a clock recovery block (CKR). Hence, the two STM-4/2 sub-frames will be synchronous with the STM-4 standard frame.

Provided downstream of the block (DE-INT) carrying out the frame de-interleaving, is a multichannel switch (SW) able to operate the hitless protection on the two sub-sets into which the original frame is divided in order to reduce the probability of information loss should problems on the radio channel occur. Therefore, the automatic exchange apparatus operates on the two STM-4/2 signals in a 2+1 protection configuration.

As SOH bytes are not used for the transmission of the service channels in the radio section, the parity controls in the B1 and B2 bytes are in no way altered. The performance monitoring parameters on the STM-4 signal may then be calculated out of the exchange section starting from the computation of the parities on B1.

Before concluding the de-interleaving process analysis, it is useful to stop on the behaviour of the pointers (FIG. 4) of the four VC-4s which are present on the AUOH (Administrative Unit OverHead) row of the STM-4 signal. As it is known, the bytes of the four pointers are arranged adjacently on the AUOH row and following upon the de-interleaving process, place themselves in the homologous rows of the two sub-frames, but they loose their original configuration.

Figure 4:
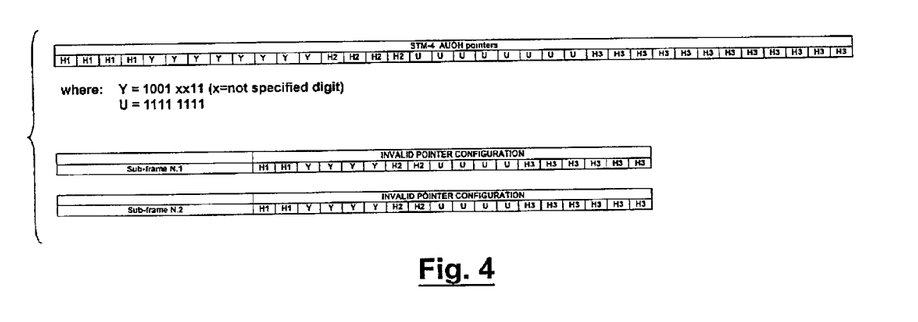
FIG. 4 shows the AUOH pointers of an STM-4 signal before and after the subdivision of the signal itself into two sub-frames.

Consider in FIG. 4 the AUOH configuration in the case where the payload sub-matrix must accomodate AU-4 structures. The two transmitted sub-frames will thus have an invalid pointer structure and only in the STM-4 frame reconstruction phase (at receiving side) it will be recomposed correctly.

Figure 2:
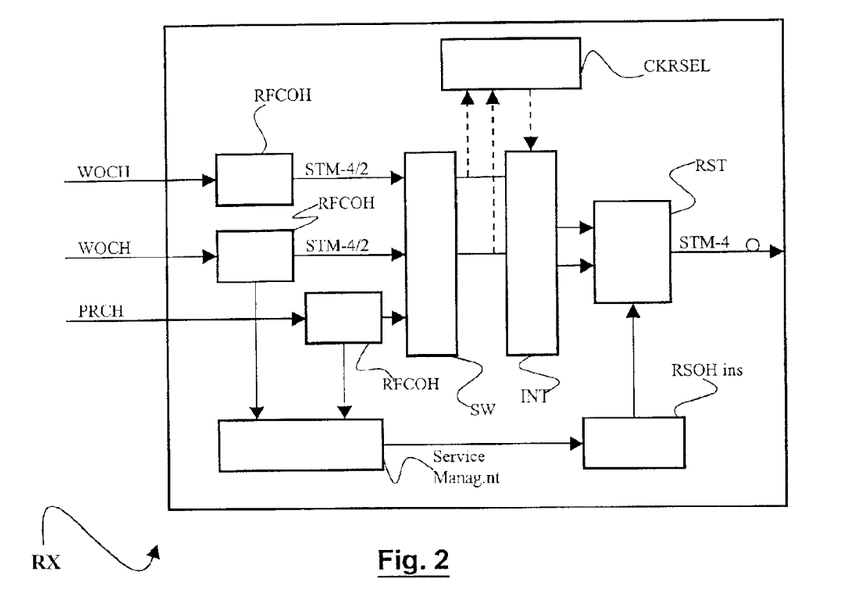
FIG. 2 shows a block diagram of the receiver apparatus according to the present invention.

Considerations similar to those made for the transmitter apparatus can be made for the apparatus receiving the STM-4/2 sub-frames and combining them again to obtain the same frame received by the transmitter apparatus. The receiver apparatus is schematically illustrated in FIG. 2.

In the receiver apparatus (RX), the RFCOH bytes are extracted from the received signals and the two STM-4/2 sub-frames are interleaved by columns through a mapping process based on the recognition of the respective alignment words and of the header which identifies the correct sequence of the two sub-matrices received for the standard STM-4 frame reconstruction. In fact, when the de-interleaving process in transmission divides the frames (by columns) into two sub-frames, inserted in the alignment word are two different headers that color its order of decomposition. In this way, during the reconstruction of the STM-4 frame in reception, the alignment device is able to identify the correct sequence of the two received sub-frames, and the interleaving does not alter the order thereof.

In the reconstruction step, the two sub-frames will place themselves correctly in the frame and also the AUOH pointer will automatically indicate the position of the first byte of the first VC-4 contained in the primitive STM-4 structure.

The hitless exchange structure operates on the STM-4/2 signals transmitted over the radio channel, managing a high priority level for that sub-frame containing the MSOH bytes (DCCM, E2, S1, M1, etc . . . ) considered of main importance and that in the above-described de-interleaving process applied to the STM-4 frame, automatically place themselves in the columns X[i] (where i=1, 7, 13) of the first sub-frame.

Figure 5:
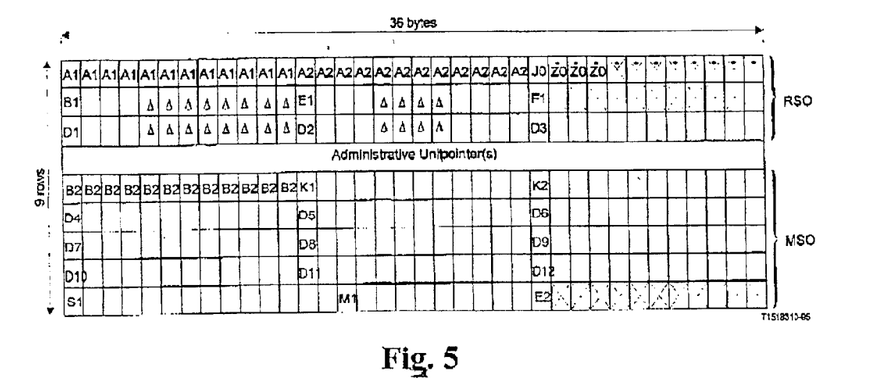
FIG. 5 shows the header of an STM-4 frame.
Figure 6:
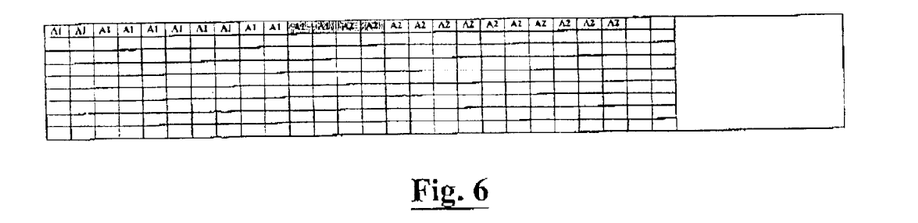
FIG. 6 shows the four bytes of the alignment word that are generally used by a state machine to detect the alignment condition.

The overhead of an STM-4 frame is represented in FIG. 5 where "x" denotes the bytes reserved for national use, "*" denotes the unscrambled bytes that must be handled with special care, and "Δ" denotes the bytes dependent on the transmission medium. In an STM-4 frame the alignment word is composed of 24 bytes (12×A1 and 12×A2), but the state machine that detects the alignment condition, as it is know, works only on the four central bytes, namely A1, A1, A2, A2 (see FIG. 6).

Figure 7:
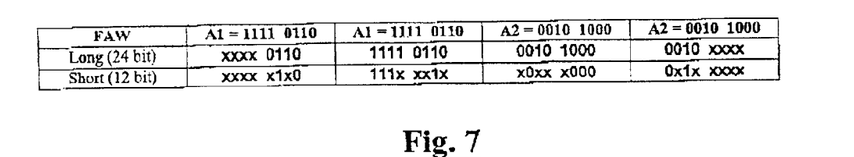
FIG. 7 shows the alignment strategy used for an STM-4 frame.

The alignment strategy used for an STM-4 frame considers a "short word" (from the alignment state to the OOF (Out Of Frame) condition) and a "long word" (from the OOF condition to the alignment state), as shown by way of example in the table of FIG. 7.

Figure 10:
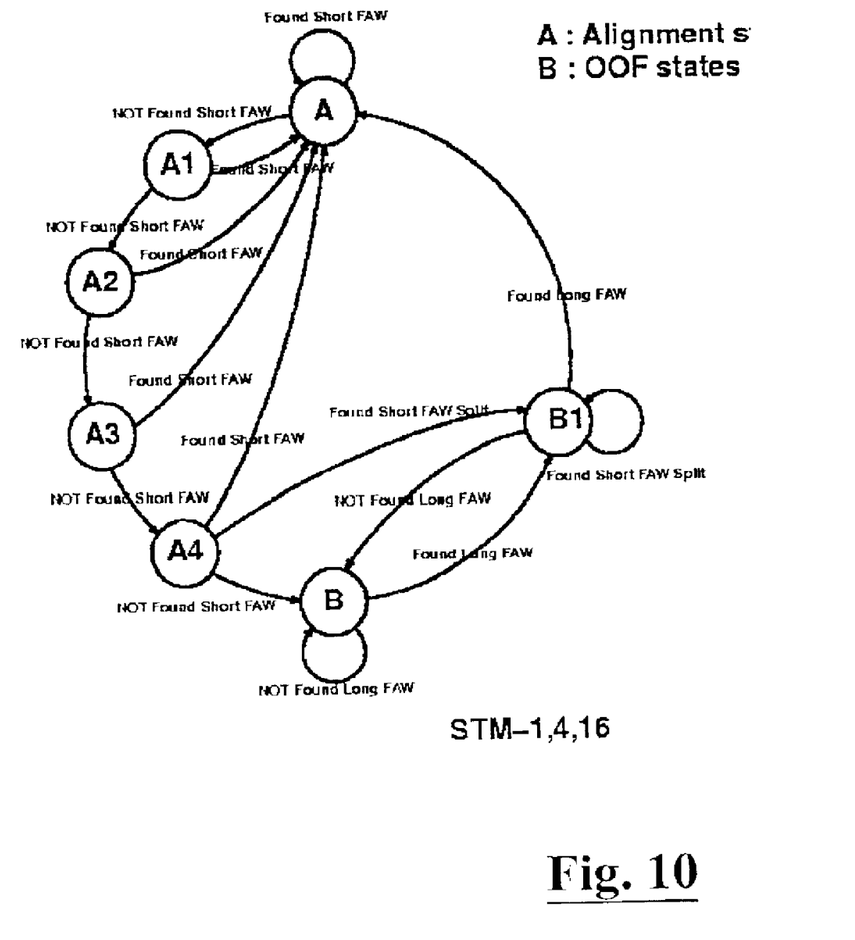
FIG. 10 shows the finite state diagram of the alignment strategy used for the STM-4 frame and for the STM-4/2 sub-frames.

In an implementation of the device according to the present invention, the parameters that characterize the performance of the STM-4 aligning device, whose finite state diagram is illustrated in FIG. 10, are summarized in the following table:

| parameters | |
|---|---|
| Average recovery T (ms) | 0.259213 |
| Max recovery T (ms) | 0.393239 |
| Forced loss T (s) | 522581 |
| Min. forced loss T (s) | 508 |
| Alignment loss average frame N | 5 |
| Alignment loss average frame N variance | 0.116 |
| Probability of false alignment loss | $2.7 \times 10^{-10}$ |

Figure 8:
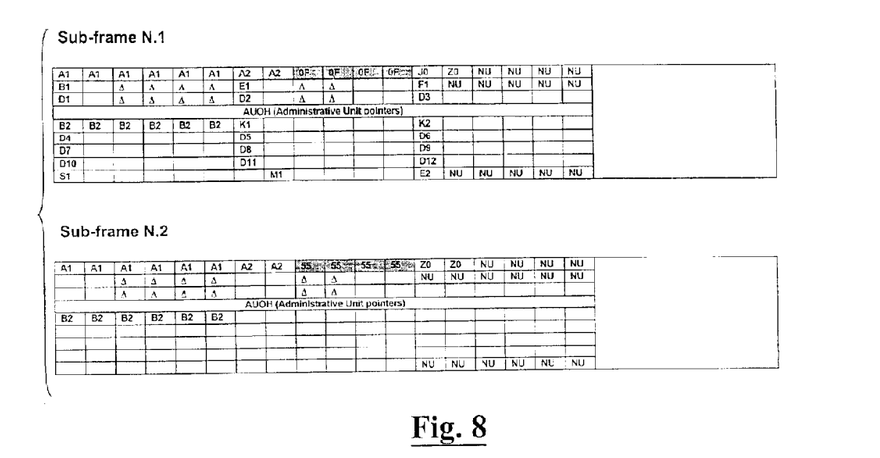
FIG. 8 shows, in two STM-4/2 sub-frames, the bytes that are used as headers to identify their arrival order at the receiver side.

When the de-interleaving process on the transmission side divides the frames by columns into two different sub-frames, the same alignment word is generated for each of the two sub-frames. Hence the algorithms used in the alignment devices for the STM-4 and STM-4/2 frames are the same since they operate on the bytes A1 A1 A2 A2 of the sole central portion of the entire alignment word (bytes #1.11, #1.12, #1.13 and #1.14 for the STM-4 standard frame and bytes #1.5, #1.6, #1.7 and #1.8 for the STM-4/2 frames). Moreover, it is necessary to univocally identify the correct sequence of the two subsets extracted from the STM-4 frames. To this end, the four A2 bytes (#1.9, #1.10, #1.11, #1.12) of the alignment word directly adjacent to the area in which the alignment device operates that will be used as a sort of "header" for the two sub-frames, are "colored". For instance (see also FIG. 8):

A2 A2 A2 A2=00001111 00001111 00001111 00001111= 0F 0F 0F 0F for the sub-frame N.1

A2 A2 A2 A2=01010101 01010101 01010101 01010101=55 55 55 55 for the sub-frame N.2

Thus, during the process of reconstructing the original STM-4 signal at the reception side (RX), the interleaving algorithm is able to identify the correct sequence of the two sub-frames transmitted in the radio channel by reading the configuration of the header bytes A2 after the alignment. Finally, the complete standard alignment word (24 bytes) is rewritted in the reconstructed STM-4 frame.

Using the solution described above, there is no need to synchronize the signals in the functional blocks described. In fact, at the transmission side (TX), the clock used for the de-interleaving mechanism and for generating the two STM-4/2 sub-frames is derived directly from the STM-4 standard signal coming into the system. At the reception side (RX), the clock used in the reconstruction process (interleaving) of the STM-4 frame can be directly selected from at least one of the STM-4/2 signals transmitted in the radio section synchronous with the incoming STM-4 signal. The failure indications on the clock extractor (LOS CK) will indicate the need to use the clock of the other STM-4/2 signal.

Figure 9:
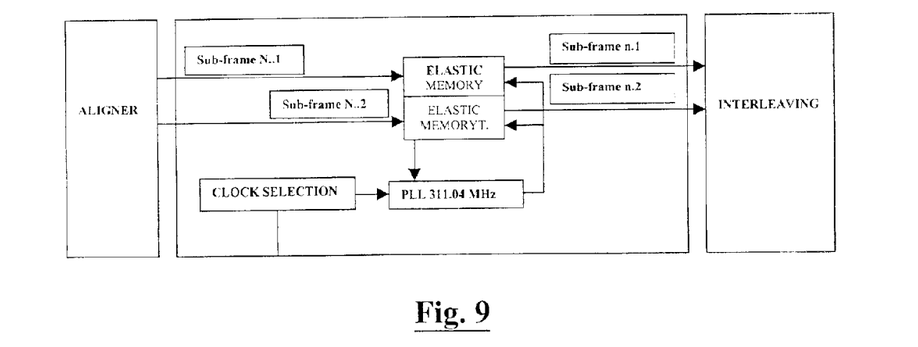
FIG. 9 shows the alignment device of the STM-4/2 sub-frames.

In the section for the reconstruction of the STM-4 frame (at reception side), it is necessary to carry out an alignment procedure of the two STM-4/2 streams transmitted in the radio section, as for instance shown in FIG. 9. It is necessary to compensate the possible clock shifts due to propagation phenomena induced on the radio transmission channel and to differences of electrical paths (length of the feeders, etc . . . ). The alignment system provides for the use of a pair of elastic memories and a 311.04 MHz PLL connected to the clock selection block.

It can be assumed that propagation phenomena (fading) may cause a clock shift equal to about one half symbol period corresponding to ±4 bits. In fact, by using a 128-state modulation scheme, the length of the transmitted symbol is equal to 7 bits, as results from the following considerations:

| | |
|---|---|
| Modulation scheme | 128 QAM |
| Bit rate (without redundancy) | 311.04 Mb/s |
| Bit period | Tb = 3.2 ns |
| Number of bits per constellation symbol | 7 bits |
| Symbol period | Ts = Tb × 7 bits = 22.4 ns |
| Delay due to fading | ±Ts/2 = ±11.2 ns |
| Delay due to fading (in bits) | ±11.2 ns/Tb = ±3.5 bits |

This means that at the input of the two elastic memories before the frame interleaving section (radio reception side) the situation could be such that every sub-frame is ±4 bit staggered relative to one another.

The read clock of the two elastic memories is always derived from only one clock, which should be the first or one of the others in the case where the first clock is degraded.

Finally, it is convenient to oversize the elastic storages so as to take into account other effects (jitter, different lengths of the electrical paths, etc . . . ) that may cause additional delays.

In case it is not possible performing the alignment between the two signals (for instance because of too large unrecoverable delays) or when one of the two STM-4/2 signals is lost at the output of the exchange section, it is necessary to send a signalling to the output block RST (line side) in order that a MSAIS alarm is inserted in the STM-4 frame and this is completely regenerated, re-calculating its parity on byte B1 and inserting the DCCR, E1, F1 channels, and any other possible service channels (anyhow protected in 1+1 configuration in the radio section).

Although the configuration which is considered the best one provides for two working channels and one protection channel, the present invention could be realized without the protection channel or possibly with more than one protection channels, as well.

There have thus been shown and described novel methods and novel apparatus for radio transmitting/receiving high order digital signals which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of radio transmitting high order synchronous digital signals, said method comprising the steps of:

receiving the digital signals in the form of standard frames comprising header bytes, the header bytes in turn comprising Regenerator Section OverHead bytes and Multiplex Section OverHead bytes;

subdividing each of the received standard frames into a number of sub-frames; and transmitting said sub-frames towards a corresponding receiver apparatus, wherein the method comprises the additional steps of:

terminating the Regenerator Section OverHead bytes of the received standard frames and performing a computation of the parity byte;

providing a Radio Frame Complementary OverHead;

transmitting the terminated Regenerator Section OverHead bytes and the Radio Frame Complementary OverHead interleaved by columns in a 1+1 protected configuration; and wherein said step of subdividing the received standard frame into a number of sub-frames comprises the step of subdividing by columns the standard frame into two sub-frames for transmitting them over working channels by using only two RF carriers without performing any multiplexing/demultiplexing operation.

2. A method according to claim 1, wherein the step of transmitting the two sub-frames by using only two RF carriers comprises the step of using an additional carrier of a protection radio channel.

3. A method according to claim 1, wherein the step of subdividing the standard frames is synchronized by means of a sync signal present in the standard frames themselves so that the sub-frames will be synchronized with the standard frames.

4. A method according to claim 1, wherein the step of subdividing the standard frames into two sub-frames comprises the step of inserting in an alignment word two different headers coloring the degree of decomposition thereof so as to identify, in a subsequent standard frame recomposition step, the correct sequence of the two received sub-frames.

5. A method according to claim 2, wherein it comprises the further step of performing a multichannel switching for operating a hitless protection on the sub-frames.

6. A method of receiving high order synchronous digital signals which have been transmitted via radio, said method comprising the steps of:

receiving sub-frames transmitted through a corresponding transmit apparatus; and combining the received sub-frames in order to obtain signal standard frames; and wherein said step of combining sub-frames comprises the step of recomposing by columns the received sub-frames through a mapping process based on the recognition of the respective alignment words and of the header to identify the correct sequence of the two received sub-frames; and wherein it further comprises the steps of extracting Regenerator Section OverHead bytes from a Radio Frame Complementary OverHead; and inserting said Regenerator Section OverHead bytes in the respective positions after the step of recomposing by columns.

7. A method according to claim 6, wherein the step of receiving sub-frames comprises the step of receiving said sub-frames transmitted over working channels by using only two RF carriers without performing any multiplexing/demultiplexing operation and possibly over a protection channel with an additional carrier.

8. A method according to claim 6, wherein the step of recomposing by columns the received sub-frames is synchronized by means of one of sync signals present in the sub-frames so that the obtained standard frames are synchronized with the sub-frames.

9. A method according to claim 6, wherein the step of recomposing by columns the received sub-frames comprises the step of aligning the received sub-frames by using a pair of elastic memories and a phase-locked loop connected to the synchronization step.

10. A method according to claim 9, wherein the step of aligning the sub-frames comprises the step of using an alignment algorithm substantially corresponding to the one used for the standard frames.

11. An apparatus for radio transmitting high order digital signals, said apparatus comprising:

means for receiving the digital signals in the form of standard frames, the standard frames comprising header bytes, the header bytes comprising Regenerator Section OverHead bytes and Multiplex Section OverHead bytes;

means for subdividing each of the received standard frames into a number of sub-frames; and means for transmitting said sub-frames towards a corresponding receiver, and wherein it further comprises:

means for terminating the header bytes of the received frames and performing computation of a parity byte;

means for sending the terminated RSOH bytes to a frame complementary section for the transmission thereof in a 1+1 protection scheme, interleaved by columns with the sub-frames, over two working channels or over a working channel and a protection channel; wherein said means for subdividing the received standard frame into a number of sub-frames comprise means designed to subdivide by columns the standard frame into two sub-frames for transmitting them over working channels by using only two RF carriers without performing any multiplexing/demultiplexing operation.

12. An apparatus according to claim 11, wherein it further comprises a multichannel switch able to perform a bridging of the two sub-frames to be transmitted over a possible protection radio channel.

13. An apparatus according to claim 11, wherein it further comprises clock recovery means restoring the sync signal directly from the received standard sub-frames.

14. An apparatus for receiving high order synchronous digital signals transmitted via radio, said apparatus comprising:

means for receiving sub-frames transmitted through a corresponding transmitter apparatus; and means for combining the received sub-frames to obtain signal standard frames; wherein said means for combining the sub-frames interleave by columns the received sub-frames through a mapping process based on the recognition of the respective alignment words and of the header to identify the correct sequence of the two received sub-frames; and wherein it further comprises means for extracting the RSOH bytes from a Radio Frame Complementary OverHead section; and means for inserting said RSOH bytes in the respective positions after the step of recomposition-by-columns.

15. An apparatus according to claim 14, wherein it further comprises a multichannel switch able to perform a hitless protection on the two received sub-frames, by using a possible protection radio channel.

16. An apparatus according to claim 14, wherein it comprises selective clock recovery means for restoring the sync signal from one or the other sub-frame.

* * * * *